May 6, 1941.  R. A. SANDBERG ET AL  2,240,802
BRAKE LEVER CONSTRUCTION
Filed Jan. 23, 1937
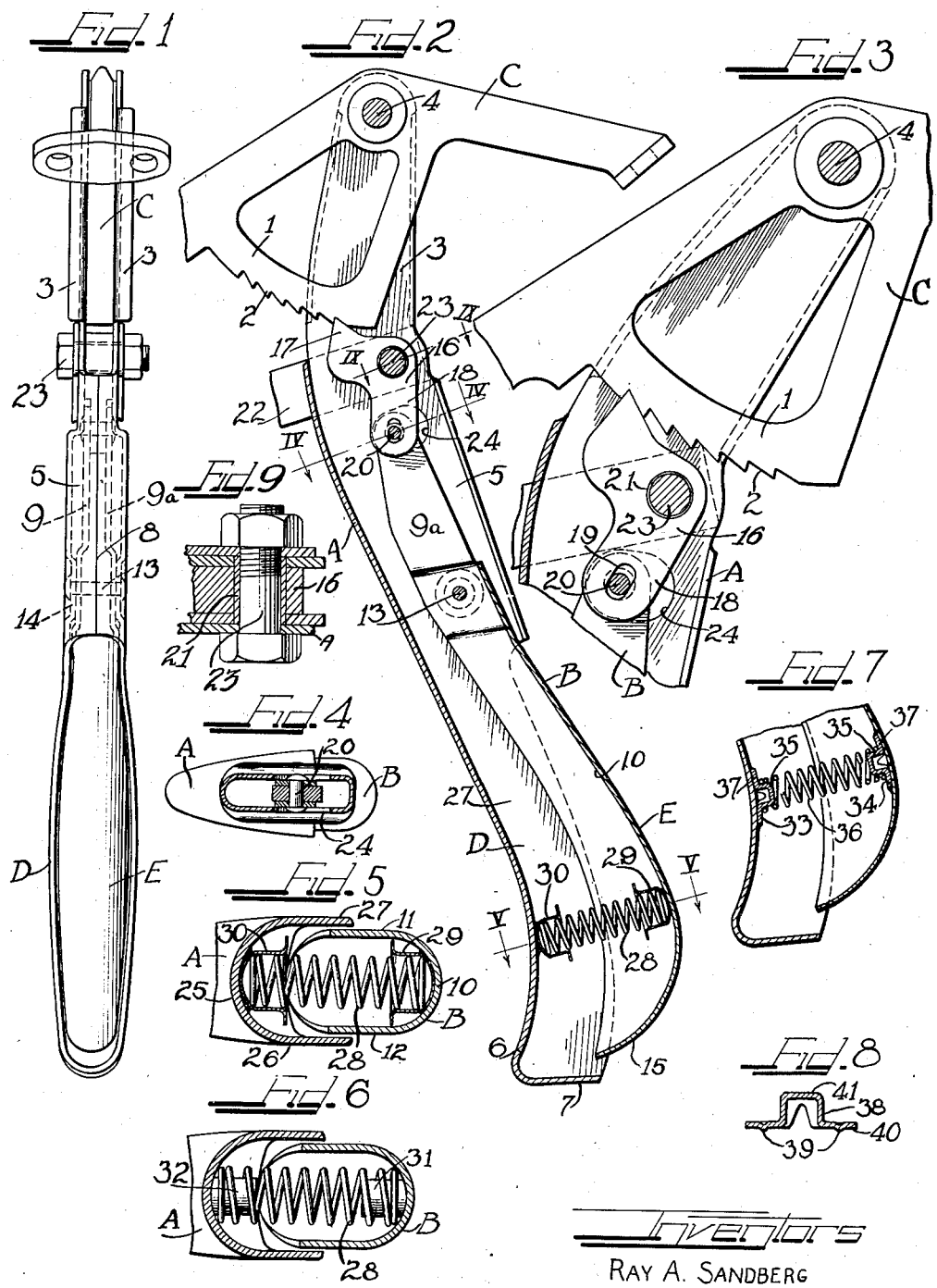
Inventors
RAY A. SANDBERG
CHARLES R. DUNCAN
by Charles Crosswell Attys.

Patented May 6, 1941

2,240,802

UNITED STATES PATENT OFFICE 2,240,802

BRAKE LEVER CONSTRUCTION

Ray A. Sandberg and Charles R. Duncan, Waukegan, Ill., assignors, by mesne assignments, to Houdaille-Hershey Corporation, Detroit, Mich., a corporation of Michigan Application January 23, 1937, Serial No. 121,942

4 Claims. (Cl. 74—537)

The present invention relates to brake lever construction and more particularly to brake levers for automotive vehicles.

An object of the present invention is to provide a brake lever of sheet metal construction, which is economical to manufacture, pleasing in appearance and efficient in operation.

Another object of the present invention is to provide a brake lever and pawl actuating mechanism constructed from flat metal stock, fashioned to provide a lever having a tubular or hollow body portion and a channel shaped handle portion, and with the actuating member of substantially channel shape throughout its length, the parts being assembled with the webs of the channel portions in opposition, and with the actuating member working within the confines of the walls of the channel handle portion of the lever.

A further object of the present invention is to provide a brake lever and pawl actuating member fashioned from flat metal stock to provide channel shaped handle portions for the lever and actuating member, and arranged with the walls of the channel handle portion of the lever overlapping the walls of the channel handle portion of the actuating member, and spring means acting against the webs of the channel handle portions and concealed from view by the overlapping walls of the said handle portions.

Another object of the present invention is to provide a novel pivot connection for the pawl.

Still another object is to provide novel means for maintaining the latch release spring in operative position.

A still further object of the present invention is to provide a novel brake lever construction of the dash type.

The above other and further objects of the invention will be apparent from the following description and accompanying drawing:

The accompanying drawing illustrates an embodiment of the present invention and the views thereof are as follows:

Figure 1 is an edge elevational view of a brake lever constructed in accordance with the principles of the present invention, showing the same pivoted to an attaching bracket.

Figure 2 is a longitudinal central section through the lever of Figure 1, showing certain parts in elevation.

Figure 3 is a fragmental enlarged view, partly in section and partly in elevation, showing the lever and the relationship of the parts thereof when the lever is in off or released position.

Figure 4 is a transverse sectional view taken substantially in the plane indicated by line IV—IV of Figure 2.

Figure 5 is a transverse sectional view taken substantially in the plane of line V—V of Fig. 2 and showing one manner of means for maintaining the spring in position.

Figure 6 is a view similar to Fig. 5 showing another means for retaining the spring in position.

Figure 7 shows another form of spring retaining means.

Figure 8 is an elevational view of a spring retaining cup adapted for projection welding.

Figure 9 is an enlarged sectional view taken on line IX—IX of Figure 2.

The drawing will now be explained.

The brake lever construction of the present invention includes a lever member, A and an actuating member B, both fashioned from flat metal stock and stamped or otherwise processed to produce the desired form and shape.

A bracket C is provided which in the dash type of levers is attached to an automotive vehicle between the dashboard and the instrument board, with the lever hanging or depending from such bracket. The bracket C is illustrated as provided with an integral quadrant I having a plurality of teeth 2 formed in a margin of the quadrant and constituting the ratchet with which the pawl of the lever cooperates in well known manner.

In the formation of the lever member A, spaced substantially parallel legs 3 and 3 are formed for pivotally attaching the lever to the bracket C. The extremities of the legs are apertured to receive a pivot pin 4 by means of which the lever is pivoted to the bracket C.

The lever member A is constructed with a tubular body portion 5 and a handle portion designated generally at D which is of channel shape in cross section. In the main, the tubular portion 5 and the handle portion B of the lever are formed in straight line construction with the extremity of the handle portion bent or curved slightly to provide a stop 6 for the hand of the operator. The free end of the channel portion D is closed as at 7. The tubular body portion 5 is formed by bringing together in edgewise abutting relation the margins of a portion of the blanks from which the lever is fashioned, making a joint 8. The construction is such that this joint is maintained in closed relation without welding or other securing means because of the characteristics of the metal employed for the formation of the lever.

The actuating member B is likewise fashioned from flat stock, processed to provide an elongated handle portion E, of channel shape in cross section, and spaced legs 9 and 9—a. The channel handle portion E has a web 10 and side walls 11 and 12. Adjacent the junction of the channel handle portion E and the legs 9 and 9—a, the actuating member B is pivoted to the lever member A by means of a pin 13 which passes through registering apertures in the actuating member walls and the walls of the tubular portion 5 of the lever as may be observed in Figures 1 and 2. Preferably the walls of the tubular portion 5 of the lever are depressed as illustrated at 14 in Figure 1 so that the heads of the pin or rivet 13 may lie within the surfaces defined by the side walls of the lever.

The actuating member B as will be observed is pivoted to the lever, within the tubular portion 5 of the lever and within the channel shaped handle portion D of the same, and works in the channel shaped handle portion D of the lever.

The free end of the actuating member B is closed, as at 15, to afford strength and also add to the appearance of the finished lever construction. Pivoted to the lever, is a pawl 16 having a point 17 adapted to engage any of the teeth 2 of the ratchet of the bracket C. The pawl has an end portion 18 in which is formed an elongated slot 19 in which rides a pivot pin 20 carried by the ends of the legs 9 and 9—a of the actuating member B, for rocking the pawl about its pivot for manipulation of the lever. The pawl is pivoted to the lever preferably by a sleeve 21 which extends through registering apertures in the side walls of the lever A and through a suitable aperture in the pawl.

A yoke 22, to which is connected the brake actuating mechanism of the vehicle, is pivoted on a pin or bolt 23 which is confined within the pivot sleeve or tube 21 of the pawl.

The actuating member B is pivoted to the lever A by assembling the actuating member within the tubular body and channel handle portion of the lever inserting the pivot pin or rivet 13 and securing it in position.

In order to insert the pivot pin 20 operatively connecting the actuating member B and the pawl 16, the walls of the lever are apertured at 24, to provide spaces for inserting the pivot pin 20 and heading it over in secured relation.

The channel shaped handle portion D of the lever A is fashioned with a web 25 with side walls 26 and 27. The channel shaped handle portions of the lever member A and the actuating member B are preferably U-shaped to eliminate sharp edges or corners and to provide rounded surfaces on the exteriors of these handle portions to afford comfort to the operator in grasping the lever for actuating it.

In order to maintain the pawl in latching engagement with the ratchet, spring means are interposed between the lever A and the actuating member B. In the present instance, spring means provided for this purpose include a coiled spring 28 inserted in the handle portions of the lever and actuating member, and in endwise engagement with the webs of the handle portions.

In order to prevent displacement of the spring in service, means must be provided.

One means suitable for maintaining the spring 28 in operative relationship comprises cups 29 and 30 permanently secured as by welding or the like to the webs of the channel shaped handle portions of the lever A and actuating member B. The cups thus maintain the spring in operative relationship and at all times serve to center the spring for carrying out its purposes.

Another form of mounting the spring 28 is indicated in Fig. 6, wherein pins 31 and 32 are flash welded to the webs of the handle portions of the actuating member B and the lever A respectively. In this modification, the springs 28 surround the pins 31 and 32.

The actuating member B is assembled within the lever A first by applying spring 28 to its supports then pivotally connecting the actuating member B to the lever A and thereafter pivotally connecting the actuating member B to the pawl 16, as heretofore described.

In the formation of the legs 2 and 3 of the lever A, the side margins thereof are preferably flanged to strengthen the legs as is common practice in construction of brake levers fashioned from flat metal stock.

It will be observed that the brake lever construction of the present invention affords a lever which is pleasing in appearance, possesses no projecting parts to interfere with clothing of the operator or other occupant of the front seat of an automotive vehicle, and which is so constructed as to be manipulated without danger of injury to the operator, as there is no part of the construction of such character as would pinch the operator's hand in the manipulation of the lever.

The lever of the present invention mounted as one of the dash type is normally behind the instrument board of the vehicle in the position occupied as illustrated in Fig. 3. To apply the brakes the operator grasps the web portion of the channel shaped handle D of the lever A and pulls it in counterclockwise direction as viewed in Figs. 2 and 3. Such movement of the lever applies the brakes, the lever being held in set position by engagement of the point 17 of the pawl 16 with the desired tooth 2 of the ratchet. The presence of the spring 28 maintains the pawl in latching engagement with the ratchet.

To release the lever, the operator grasps the handle portions of the lever and actuating member and squeezes the handle of the actuating member B against the spring 28 to unlatch the pawl from the ratchet, whereupon the lever may be returned to its normal or released position or to any other position along the ratchet.

The construction of the lever as herein described enables manufacture of sturdy strong levers from relatively thin stock so that satisfactory levers may be provided at a minimum of manufacturing costs.

Preferably the tubular body portion and the channel handle portion of the lever A are in straight line relation, and at a slight angle with respect to the legs 3 and 3. However, the legs and tubular and handle portions of the lever A might be in substantially straight line arrangement if desired.

Another spring retaining construction is illustrated in Fig. 7 wherein cup members 33 and 34 are utilized. Each of the members 33 and 34 is fashioned with a cup portion 35 adapted to enter an end of the spring 36 and hold it in place. In addition, each cup member has a flange 37 for welding to an adjacent handle web. The flanges or ears 37 are made large enough to afford ample space to position the members 33 and 34 without interference of electrode of the spot welding machine and the cup members.

The cup member 38 of Fig. 8 is formed with pointed projections 39 from the under surface of its flange 40 whereby the member may be projection welded in place. The cup portion 41 enters an end of a spring to center it, in the manner described with reference to Fig. 7.

The novel pivotal mounting of the pawl 18 on the lever A by means of the hollow member, sleeve or tube 21, has been found to be useful in mounting the lever in place behind an instrument board.

Due to the position of dash type brake levers, which are mounted behind the instrument boards of automotive vehicles, it has been found difficult for the assembly, when the pawls are carried by the bolts or pins which connect the brake mechanism to the levers, to easily align the pawl aperture with the lever aperture and the yoke aperture for the application of the single pivot bolt or pin.

The present construction obviates the mentioned difficulty by pivoting the pawl to the lever by a tube or hollow member 21, prior to the mounting of the lever on its support. After a lever is pivoted to its bracket C, the yoke 22 is then easily connected to the lever, as all the assembler has to do is to align the yoke apertures with the tube 21 and push the bolt or pin 23 in place, which may be quickly done.

The invention has been described herein more or less precisely as to details, yet it is to be understood that the invention is not limited thereby as changes may be made in the arrangement and proportion of parts, and equivalents may be substituted, without departing from the spirit and scope of the invention.

The invention is claimed as follows:

1. Lever construction including a lever member comprising a stamping forming a hollow shank portion, a channel shaped grip portion at one end and spaced legs at the other end for pivotal connection to and astraddle a support; a pawl pivoted within said shank portion; a one piece pawl release member extending substantially coincident with a major portion of the lever member and having pivotal connection with the lever member and having a channel shaped grip portion working within the channel shaped grip portion of the lever member; said pawl being provided with an elongated slot; a pin carried by said pawl release member and engaging said slot to pivotally connect said pawl and pawl release member in operative relation; and spring means acting against said pawl release member to normally maintain it in one position and the pawl in latched engagement with a ratchet.

2. Lever construction including a lever member comprising a stamping forming a hollow shank portion, a channel shaped grip portion at one end and spaced legs at the other end for pivotal connection to and astraddle a support; a pawl pivoted within said shank portion; a stamped pawl release member having a channel shaped grip portion at one end and spaced legs at the other end and pivotally connected to said lever member and arranged with its grip portion working within the grip portion of said lever member and its legs working within the shank portion of the lever member; said pawl having a part working between the legs of said release member; said pawl part and said release member legs being pivotally connected together by cooperating pin and elongated slot means; and a spring acting against said pawl release member to normally maintain said member in one position and said pawl in latched engagement with a ratchet.

3. Lever construction including a lever member comprising a stamping forming a hollow shank portion, a channel shaped grip portion at one end and spaced legs at the other end for pivotal connection to a support; a pawl pivoted within the shank portion of said lever member; a stamped pawl release member having a channel shaped grip portion at one end and spaced legs at the other end and pivotally connected to said lever member and arranged with its grip portion working within the grip portion of said lever member and its legs working within the shank portion of the lever member; said pawl having a part working between the legs of said release member and provided with an elongated slot, the legs of said pawl release member carrying a pin extending through said slot for pivotally connecting said pawl and pawl release member together in operative relation; and a spring acting against said pawl release member to normally maintain said member in one position and said pawl in latched engagement with a ratchet.

4. Lever construction including a lever member comprising a stamping forming a hollow shank portion, a channel shaped grip portion at one end and spaced legs at the other end for pivotal connection to a support; a pawl pivoted within the shank portion of said lever member; a one-piece pawl release member extending substantially coincident with a major portion of the lever member and having pivotal connection with the lever member and having a channel shaped grip portion working within the channel shaped grip portion of the lever member; said pawl and said pawl release member having parts arranged in lapped relation; one of said lapped parts being provided with an elongated slot and another of said lapped parts carrying a pin working within said slot for pivotally connecting said pawl and said pawl release member together in operative relation, and spring means effective to normally maintain said pawl release member in one position and said pawl in latched engagement with a ratchet.

RAY A. SANDBERG.
CHARLES R. DUNCAN.